(12) United States Patent
Reinhard-Herrscher et al.

(10) Patent No.: US 11,445,743 B2
(45) Date of Patent: Sep. 20, 2022

(54) SYSTEM FOR PREPARING OR SEMI-PREPARING FOOD

(71) Applicant: ELECTROLUX APPLIANCES AKTIEBOLAG, Stockholm (SE)

(72) Inventors: Fabienne Reinhard-Herrscher, Schnelldorf (DE); Jennifer Burkhardt, Rothenberg ob der Tauber (DE); Christoph Luckhardt, Rothenberg ob der Tauber (DE); Kersten Kaiser, Rothenberg ob der Tauber (DE)

(73) Assignee: Electrolux Appliances Aktiebolag, Stockholm (SE)

( * ) Notice: Subject to any disclaimer, the term of this patent is extended or adjusted under 35 U.S.C. 154(b) by 401 days.

(21) Appl. No.: 16/329,924

(22) PCT Filed: Sep. 7, 2017

(86) PCT No.: PCT/EP2017/072413
§ 371 (c)(1),
(2) Date: Mar. 1, 2019

(87) PCT Pub. No.: WO2018/046573
PCT Pub. Date: Mar. 15, 2018

(65) Prior Publication Data
US 2019/0239554 A1     Aug. 8, 2019

(30) Foreign Application Priority Data

Sep. 9, 2016   (EP) .................................. 16188021

(51) Int. Cl.
*A23P 30/20*   (2016.01)
*B29C 64/209*  (2017.01)
(Continued)

(52) U.S. Cl.
CPC ................. *A23P 30/20* (2016.08); *A23L 5/10* (2016.08); *A23P 20/20* (2016.08); *B29C 64/209* (2017.08);
(Continued)

(58) Field of Classification Search
None
See application file for complete search history.

(56) References Cited

U.S. PATENT DOCUMENTS

2005/0005612 A1 * 1/2005 Kennedy ............... A47J 36/321
                                                            62/3.3
2012/0328747 A1   12/2012 Levy
(Continued)

FOREIGN PATENT DOCUMENTS

WO   2012103005 A2   8/2012
WO   2014190168 A1   11/2014
(Continued)

OTHER PUBLICATIONS

International Search Report and Written Opinion issued in corresponding PCT application No. PCT/EP2017/072413 dated Dec. 8, 2017, 9 pages.

*Primary Examiner* — John J Norton
(74) *Attorney, Agent, or Firm* — Pearne & Gordon LLP

(57) ABSTRACT

A system for preparing or semi-preparing food that includes at least one 3D printer and at least one food supporting device. The 3D printer includes at least one extruder for delivering and modelling at least one food paste and/or food powder onto the food supporting device, and at least one heating device for preheating the food paste and/or the food powder and at least one cooling device for precooling the food paste and/or the food powder. The 3D printer is controlled or controllable by a user interface, microcontroller, computer and/or computer program. The system includes at least one cooking hob for heating the modelled (Continued)

Figure 1:
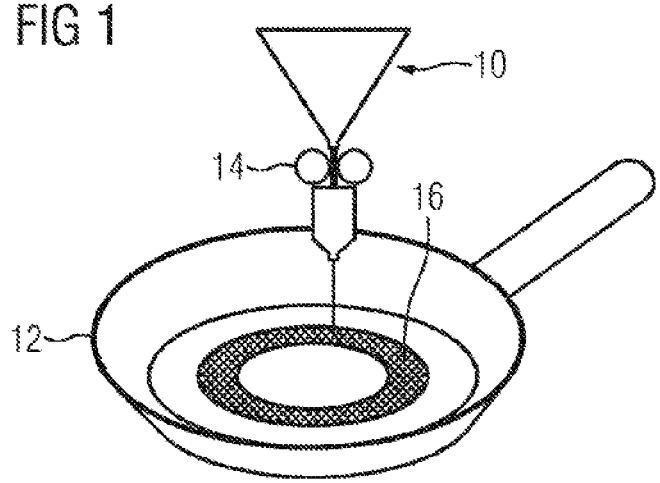

food on the food supporting device. The temperature for each food paste and/or food powder is individually adjustable. The food supporting device is a pan, cooking vessel, cooking pot, tray, plancha or container arranged on a cooking zone of the cooking hob.

18 Claims, 2 Drawing Sheets

(51) Int. Cl.
| | |
|---|---|
| *B29C 64/295* | (2017.01) |
| *B29C 64/255* | (2017.01) |
| *B33Y 10/00* | (2015.01) |
| *B33Y 30/00* | (2015.01) |
| *A23P 20/20* | (2016.01) |
| *B29C 64/268* | (2017.01) |
| *B29C 64/277* | (2017.01) |
| *B33Y 50/02* | (2015.01) |
| *B33Y 70/00* | (2020.01) |
| *A23L 5/10* | (2016.01) |
| *A23P 20/25* | (2016.01) |

(52) U.S. Cl.
CPC .......... *B29C 64/255* (2017.08); *B29C 64/268* (2017.08); *B29C 64/277* (2017.08); *B29C 64/295* (2017.08); *B33Y 10/00* (2014.12); *B33Y 30/00* (2014.12); *B33Y 50/02* (2014.12); *B33Y 70/00* (2014.12); *A23P 2020/253* (2016.08); *A23V 2002/00* (2013.01)

(56) References Cited

U.S. PATENT DOCUMENTS

| | | | |
|---|---|---|---|
| 2014/0013962 A1* | 1/2014 | Lipton | B33Y 30/00 99/353 |
| 2016/0067866 A1 | 3/2016 | Sekar et al. | |
| 2016/0106142 A1* | 4/2016 | Contractor | A23P 20/20 426/231 |
| 2017/0245682 A1* | 8/2017 | Gracia | B33Y 10/00 |
| 2018/0192686 A1* | 7/2018 | Shoseyov | A23L 33/20 |
| 2019/0142057 A1* | 5/2019 | Erbe | B33Y 30/00 99/326 |

FOREIGN PATENT DOCUMENTS

| | | |
|---|---|---|
| WO | 2014190217 A1 | 11/2014 |
| WO | 2016059023 A1 | 4/2016 |

* cited by examiner

SYSTEM FOR PREPARING OR SEMI-PREPARING FOOD

The present invention relates to a system for preparing or semi-preparing food, wherein said system includes at least one 3D printer and at least one food supporting device. Further, the present invention relates to a method for preparing or semi-preparing food by at least one 3D printer and at least one food supporting device, wherein the method is controlled or controllable by a computer and/or computer program.

The present invention relates to a system for preparing or semi-preparing food, wherein said system includes at least one 3D printer and at least one food supporting device, according to the preamble of claim 1. Further, the present invention relates to a method for preparing or semi-preparing food by at least one 3D printer and at least one food supporting device, wherein the method is controlled or controllable by a computer and/or computer program.

Recently 3D printers for printing food as domestic appliances have been developed. The 3D printers for printing food use technologies like fused deposition modelling, selective laser melting or sintering, stereo-lithography and granular material binding. Basis ingredients for the food are stored in a container and mixed in a mixing chamber. The resulting food paste or food powder is delivered be an extruder and modelled on a food supporting device. For example, the food paste is made of a powder and water.

A pizza printer has been developed for a use in space. Chocolate and marzipan in a design of buildings is producible by special 3d printers. Individual pancakes are available from the 3d printer.

The known 3D printers provide modelled food, which afterwards is cooked in a conventional way. Some components of the modelled food include special mixtures. The modelled food is defined by its geometric shape and by the consistence of its components.

WO 2016/059023 A1 discloses a food printer mountable in a treatment compartment of a domestic cooking oven or a domestic refrigerator. The food printer comprises a heating device and/or a cooling device. A storage space is provided for receiving a number of cartridges containing food paste. The storage space is cooled down by the cooling device and/or heated up by the heating device. The food paste is disposed on a tray of the domestic cooking oven or domestic refrigerator.

US 2012/0251688 A1 discloses an additive manufacturing system for printing a chocolate confection. The system comprises a recirculation loop for circulating a flow of chocolate material and for maintaining a temper of said chocolate material. Further, the system comprises a print head for extruding and depositing the chocolate material onto a platen. A shear tank is provided for heating and shearing the chocolate material. The chocolate material is conveyed from the shear tank to the print head by a pump.

It is an object of the present invention to provide a system for preparing or semi-preparing food, which allows a suitable cooking process adapted to complex food including different components.

According to the present invention the temperature for each food paste and/or food powder is individually adjustable, wherein the cooking appliance is a cooking hob, and wherein the food supporting device is a pan, cooking vessel, cooking pot, tray, plancha or container arranged on a cooking zone of said cooking hob.

The core of the present invention is the heating device and the cooling device of the 3D printer, wherein at least one, in particular each, food paste and the food powder may be provided with an adjusted individual temperature. For example, the printed food may comprise several components, wherein said components are formed of layers arranged on top of each other on the food supporting device. Alternatively or additionally, the components of the printed food may be arranged side by side on the food supporting device. The food modelled on the food supporting device may be readily prepared and edible. Further, the food modelled on the food supporting device may be semi-prepared and provided for an immediate or later cooking. The heating device and the cooling device of the 3D printer allow that a suitable temperature may be adjusted for at least one, in particular for each, component. In particular, the printed food according to the present invention is additionally defined by the temperatures of its different components.

For example, the heating of the modelled food on the food supporting device by the cooking appliance is a semi-cooking or pre-cooking of said modelled food, wherein the cooking process is finished in another cooking device. Further, the heating of the modelled food on the food supporting device by the cooking appliance may be performed for improving the adhesion of said modelled food.

In particular, the temperature for each food paste and/or food powder is individually adjustable inside the extruder. Also the interior of the extruder is suitable for an individual adjusting of the temperature for each food paste and/or food powder.

For example, the cooking hob is an induction cooking hob, a gas cooking hob or a radiant cooking hob and includes at least one temperature control device, wherein preferably the induction cooking hob, gas cooking hob or radiant cooking hob, respectively, includes at least one temperature sensor.

Preferably, the food supporting device includes or corresponds with a further heating device for treating the modelled food or components of said modelled food on the food supporting device. Said further heating device may be provided for an immediate heating of the modelled food or components thereof on the food supporting device.

In particular, the further heating device is provided for cutting, decorating and/or cooking the modelled food or components of said modelled food on the food supporting device.

In a similar way, the food supporting device may include or correspond with a further cooling device for cooling down the modelled food or components of said modelled food on the food supporting device. The cooling device may be provided for an immediate cooling of the modelled food or components thereof on the food supporting device.

Additionally, the food supporting device is filled or fillable with fluid, preferably water or oil. Said fluid allows a rapid heat transfer to the extruded food paste and/or food powder. For example, this is advantageous for spaetzle, churros, doughnut, fried pasta and the like.

Moreover, the food supporting device may include a plurality of heating elements, wherein said heating elements are individually controllable. For example, the heating elements are small induction coils of a flexible induction cooking hob. The heating process for each printed modelled food may be individualised. Different kinds of small pieces of modelled food, e.g. small pancakes, may be finished at the same time.

Further, the 3D printer may include at least one mixing chamber for preparing the food paste and/or food powder from one or more basic ingredients.

Moreover, the 3D printer may include at least one container for storing one of the basic ingredients in each case. Preferably, the mixing chamber is connected to several containers.

In regard to the technical realisation, the heating device and/or the further heating device include at least one laser, infrared heating element, hot air blower and/or Peltier element in each case.

For example, the heating device and/or the further heating device may be provided for melting granulated basic ingredients.

Also the cooling device and/or the further cooling device may include at least one Peltier element in each case.

For example, the laser is provided for melting granulated basic ingredients.

Further, the laser may be provided for cooking the modelled food or components of said modelled food on the food supporting device. For example, the laser is provided for cooking a top side of the modelled food or components thereof on the food supporting device. In contrast, a bottom side of the modelled food or components thereof is cooked by the further heating device of the food supporting device.

Moreover, the laser may be provided for cutting or decorating the modelled food or components of said modelled food on the food supporting device.

Further, the cooking appliance may be a cooking oven, wherein preferably the food supporting device is a baking tray or grid.

Further, the present invention relates to a method for preparing or semi-preparing food by at least one 3D printer and at least one food supporting device, wherein the method is controlled or controllable by a user interface, microcontroller, computer and/or computer program and comprises the steps of
- providing at least one food paste and/or food powder,
- preheating or precooling at least one of said at least one food paste and/or food powder by a heating or a cooling device, respectively, so that the temperature for each food paste and/or food powder is individually adjustable, and
- delivering and modelling the food paste and/or food powder onto the food supporting device by an extruder of the 3D printer, and the wherein method is performed by the system mentioned above.

At least one, in particular each, food paste or food powder may be provided with an adjusted individual temperature. For example, the printed food may comprise several components, wherein said components are formed of layers arranged on top of each other on the food supporting device. Some of the components of the printed food may be arranged side by side on the food supporting device. The food modelled on the food supporting device may be either readily prepared and edible or semi-prepared and provided for an immediate or later cooking. The preheating and precooling allow that a suitable temperature may be adjusted for at least one, in particular for each, component.

Preferably, basic ingredients are provided, stored and automatically mixed in order to obtain the food paste and/or food powder.

At last, the food paste and/or food powder is prepared at different ratios of basic ingredients in the mixing chamber or in a separate mixing chamber of the extruder. This allows the creation of specific attributes for different layers of the modelled food. For example, the outer region of the modelled food gets high viscosity for stability. In contrast, the inner region of the modelled food obtains low viscosity in order to improve the taste.

Novel and inventive features of the present invention are set forth in the appended claims.

Figure 2:
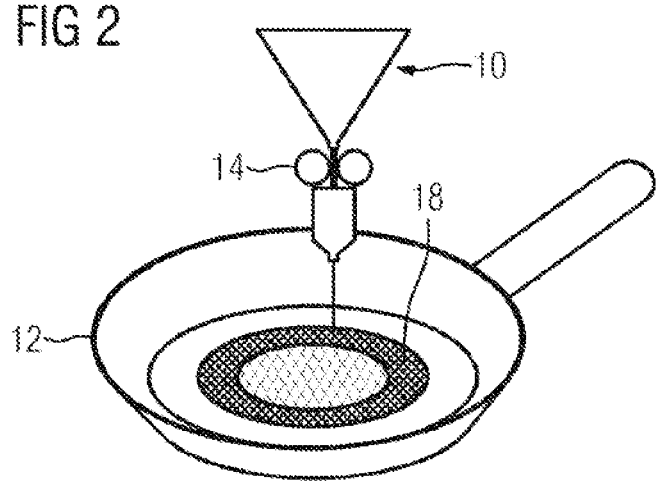
Figure 3:
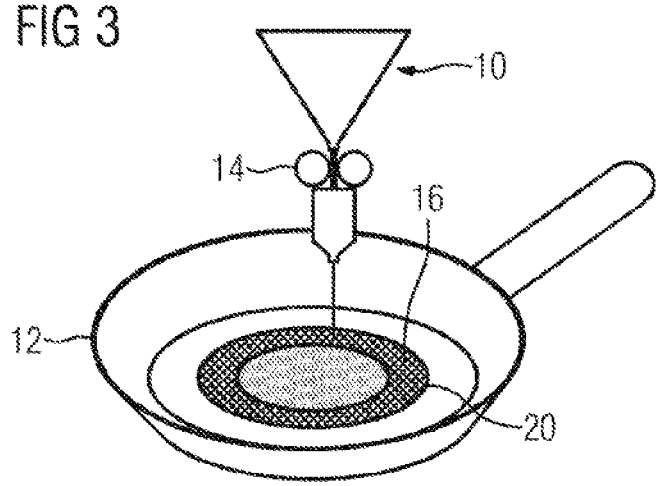
Figure 4:
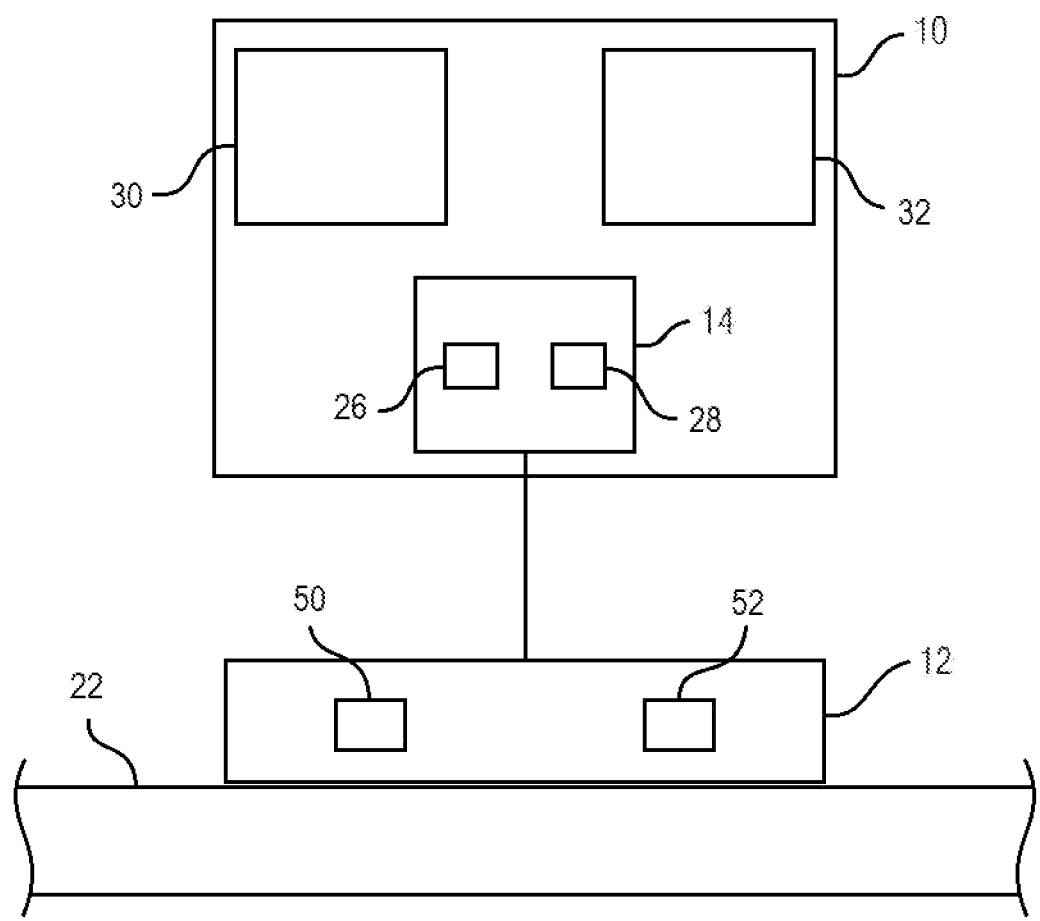

The present invention will be described in further detail with reference to the drawings, in which FIG. 1 illustrates schematically a first step of an example of preparing food by a 3D printer and a pan according to an embodiment of the present invention, FIG. 2 illustrates schematically a second step of the example of preparing food by the 3D printer and the pan according to the embodiment of the present invention, FIG. 3 illustrates schematically a third step of the example of preparing food by the 3D printer and the pan according to the embodiment of the present invention, and FIG. 4 illustrates schematically a side view of the 3D printer, the pan, and a cooking hob according to the embodiment of the present invention.

FIG. 1 illustrates schematically a first step of an example of preparing food by a 3D printer 10 and a pan 12 according to an embodiment of the present invention. This example of preparing food relates modelling and baking a pancake filled by chocolate.

In this example, the 3D printer 10, the pan 12 and a cooking hob (see FIG. 4) supporting said pan 12 form the system for preparing or semi-preparing food. In general, said system for preparing or semi-preparing food according to the present invention comprises at least one 3D printer 10, at least one food supporting device 12 and a cooking appliance.

In this example, the food supporting device 12 is the pan 12. Further, the food supporting device 12 may be a cooking vessel, cooking pot, tray, plancha or container.

The 3D printer 10 includes an extruder 14 arranged above the pan 12. The extruder 10 is provided for delivering and modelling food paste and/or food powder onto the pan 12. The pan 12 is arranged on a cooking zone of the cooking hob 22. The extruder 14 includes a heating device 26 (see FIG. 4) for preheating food paste and/or food powder. Further, the extruder 14 includes a cooling device 28 (see FIG. 4) for precooling food paste and/or food powder.

Further, the temperature for each food paste and/or food powder may be individually adjustable inside the extruder 10. For example, the interior of the extruder 10 is suitable for an individual adjusting of the temperature for each food paste and/or food powder.

The cooking hob 22 may be an induction cooking hob, a gas cooking hob or a radiant cooking hob and includes preferably at least one temperature control device. In particular, the induction cooking hob, gas cooking hob or radiant cooking hob, respectively, includes at least one temperature sensor.

In FIG. 1 the extruder 14 delivers and models dough 16 onto the pan 12. Said dough 16 is provided for a pancake 20. The dough 16 is cooled down by the cooling device of the extruder 14. The dough 16 in FIG. 1 forms a lower layer of the pancake 20.

FIG. 2 illustrates schematically a second step of the example of preparing food by the 3D printer 10 and the pan 12 according to the embodiment of the present invention. The extruder 14 is still arranged above the pan 12.

In FIG. 2 the extruder 14 delivers and models chocolate 18 onto the lower layer made of dough 16. Said chocolate is provided as filling of the pancake 20. The chocolate 18 is warmed up by the heating device of the extruder 14. Thus, the dough 16 and the chocolate 18 delivered onto the pan have different temperatures.

FIG. 3 illustrates schematically a third step of the example of preparing food by the 3D printer and the pan according to the embodiment of the present invention. The extruder 14 is still arranged above the pan 12.

In FIG. 3 the extruder 14 delivers and models dough 16 onto the layer made of chocolate 16. Said dough 16 is provided for an upper layer of the pancake 20. The dough 16 is cooled down by the cooling device of the extruder 14. The pancake is baked in the pan 12. The result is the pancake 20 with chocolate filling.

Further, the 3D printer 10 may prepare food with special shapes. For example, the 3D printer 10 may prepare multi-coloured cakes and cookies.

In this example, the pancake 20 is prepared for an immediate baking in the pan 12 on the activated cooking hob. Alternatively, the printed food 20 may be semi-prepared for later cooking. In the latter case, the pan 12, the baking tray or another food supporting device 12 is loaded with printed food 20 by the 3D printer 10. The semi-prepared printed food 20 allows an improved stability and food safety. The heating device 26 and cooling device 28 of the 3D printer 10 allow different starting temperatures of at least two of the parts and layers of the printed food 20.

For example, the heating of the printed food 20 on the pan 12 is a semi-cooking or pre-cooking of said printed food 20, wherein the cooking process is finished in another cooking device. Further, the heating of the printed food 20 on the pan 12 may be performed for improving the adhesion of said printed food 20.

For example, the heating device 26 of the 3D printer 10 may be realised by at least one laser, as shown schematically in FIG. 4. Further, the heating device 26 of the 3D printer 10 may include one or more infrared heating elements. Moreover, the heating device 26 of the 3D printer 10 may be realised by at least one hot air blower. Furthermore, the heating device 26 of the 3D printer 10 may include one or more Peltier elements. In a similar way, the cooling device 28 of the 3D printer 10 may include one or more Peltier elements.

The 3D printer 10 may be a part or an integrated part of the cooking appliance. In this case, the food supporting device 12 may be the pan 12 or a cooking vessel on a cooking hob, the baking tray or a grid in a cooking oven. Moreover, the 3D printer 10 may be a part or an integrated part of an induction cooking hob, wherein only the heating zone printed by the extruder is heated, for example. Further, the 3D printer 10 may be an integrated part of a steamer oven or microwave oven.

The 3D printer 10 with the food supporting device 12 may be also an independent stand-alone apparatus. In this case, the printed food 20 may be either semi-prepared for later cooking or readily prepared and edible.

The 3D printer 10 may include a mixing chamber 30 (see FIG. 4), in which the food paste or food powder is mixed of the basic ingredients. The food paste and food powder may be mixed according to predetermine recipes before heating, cooling and/or extruding. For example, the food paste is made by mixing power and water. The 3D printer 10 may also include at least one container 32 (see FIG. 4) for storing one of the basic ingredients in each case, as discussed above. Preferably, the mixing chamber 30 is connected to several containers 32.

Also the food supporting device 12 may include a heating device 50 and/or a cooling device 52 (see FIG. 4), wherein the temperature on said food supporting device 12 is adjustable and changeable. For example, the temperature on the food supporting device 12 is adapted to that component of the printed food 20, which is currently modelled by the 3D printer 10. Further, the heating device 50 and the cooling device 52 of the food supporting device 12 may be provided for a heat treatment or cooling-down, respectively, of the printed food 20.

Furthermore, the food supporting device 12 may be filled with fluid, preferably water or oil. Said fluid allows a rapid heat transfer to the printed food 20. For example, this is advantageous for spaetzle, churros, doughnut, fried pasta and the like.

Moreover, the food supporting device 12 may include a plurality of heating elements, wherein said heating elements are individually controllable. For example, the heating elements are small induction coils of a flexible induction cooking hob. The heating process for each printed food 20 may be individualised. Different kinds of small pieces of modelled food, e.g. small pancakes, may be finished at the same time.

For example, the heating device 50 of the food supporting device 12 may be realised by at least one laser. Further, the heating device 50 of the food supporting device 12 may include one or more infrared heating elements. Moreover, the heating device 50 of the food supporting device 12 may be realised by at least one hot air blower. Furthermore, the heating device 50 of the food supporting device 12 may include one or more Peltier elements. In a similar way, the cooling device 52 of the food supporting device 12 may include one or more Peltier elements.

Further, the system may comprise one or more heating devices for treating the basic ingredients, the food paste, the food powder and/or the printed food 20. For example, the heating device is provided for melting granulated sugar, fat or cacao powder. Further, the heating device may locally cook the printed food 20. Moreover, the heating device may be used for decorative purposes. For example, a pattern on the printed food 20 is generated by the laser. Moreover, the heating device may cut the printed food 20.

Moreover, the food paste, food powder and/or printed food 20 may be prepared at different ratios of basic ingredients in the mixing chamber 30 or in a separate mixing chamber of the extruder 14. This allows the creation of specific attributes for different layers of the printed food 20. For example, the outer region of the printed food 20 gets high viscosity for stability. In contrast, the inner region of the printed food 20 obtains low viscosity in order to improve the taste.

In particular, the printed food 20 may be cookies, chocolate, noodles, pizza, French fries, soy food, ice cream, mousse, pudding, cupcakes and/or sausages. Further, the printed food 20 may contain fillings. The 3D printer 10 allows the creation of multi-coloured printed food 20.

The system according to the present invention allows an automatic food preparation, wherein just the basic ingredients have to be added. The 3D printer 10 creates perfect shapes and decoration for the printed food 20. Single components of the printed food 20 may be precisely cooked at a desired temperature. The inventive system consumes less energy. The basic ingredients have a relative long shelf life. The inventive system provides a new culinary enjoyment.

LIST OF REFERENCE NUMERALS

10 3D printer
12 pan, food supporting device 14 extruder
16 dough
18 chocolate
20 food, printed food, pancake
22 cooking hob
26 heating device
28 cooling device
30 mixing chamber
32 container
50 heating device
52 cooling device

The invention claimed is:

1. A system for preparing or semi-preparing food, said system comprising at least one 3D printer and at least one food supporting device, said 3D printer comprising:
    at least one extruder for delivering and modelling at least one food paste and/or food powder to yield a modelled food onto the food supporting device,
    at least one heating device for preheating at least one of said at least one food paste and/or food powder, and
    at least one cooling device for precooling at least one of said at least one food paste and/or food powder;
    the 3D printer being controlled or controllable by a user interface, a microcontroller, a computer and/or a computer program;
    the system further comprising a cooking hob for heating the modelled food on the food supporting device;
    wherein a temperature for each of said at least one food paste and/or food powder is individually adjustable inside the at least one extruder, and wherein the food supporting device is a pan, a cooking vessel, a cooking pot, a tray, a plancha or a container arranged on a cooking zone of said cooking hob.

2. The system according to claim 1, wherein the cooking hob is an induction cooking hob, a gas cooking hob or a radiant cooking hob and includes at least one temperature control device and at least one temperature sensor.

3. The system according to claim 1, wherein the food supporting device includes or corresponds with a further heating device for treating the modelled food or components of said modelled food on the food supporting device.

4. The system according to claim 3, wherein the heating device and/or the further heating device include at least one laser, infrared heating element, hot air blower and/or Peltier element.

5. The system according to claim 3, wherein the heating device and/or the further heating device are provided for melting granulated basic ingredients.

6. The system according to claim 1, wherein the food supporting device includes or corresponds with a further cooling device for cooling down the modelled food or components of said modelled food on the food supporting device.

7. The system according to claim 6, wherein the cooling device and/or the further cooling device include at least one Peltier element.

8. The system according to claim 1, wherein the food supporting device is filled or fillable with fluid.

9. The system according to claim 1, wherein the food supporting device includes a plurality of heating elements that are individually controllable.

10. The system according to claim 1, wherein the 3D printer includes at least one mixing chamber for preparing the at least one food paste and/or food powder from one or more basic ingredients.

11. The system according to claim 10, wherein the 3D printer includes at least one container for storing one of the basic ingredients.

12. The system according to claim 1, wherein the cooking hob supports the food supporting device.

13. A method for preparing or semi-preparing food by at least one 3D printer and at least one food supporting device, said method being controlled or controllable by a user interface, a microcontroller, a computer and/or a computer program and comprising the steps of:
    providing at least one food paste and/or food powder,
    preheating or precooling at least one of said at least one food paste and/or food powder by a heating or a cooling device, respectively, so that the temperature for each said at least one food paste and/or food powder is individually adjustable, and
    delivering and modelling the at least one food paste and/or food powder onto the food supporting device by an extruder of the 3D printer,
    wherein the method is performed by a system according to claim 1.

14. The method according to claim 13, wherein basic ingredients are provided, stored and automatically mixed in order to obtain the at least one food paste and/or food powder.

15. The method according to claim 13, wherein:
    the 3D printer includes at least one mixing chamber for preparing the at least one food paste and/or food powder from one or more basic ingredients, and
    the at least one food paste and/or food powder is prepared at different ratios of basic ingredients in the mixing chamber.

16. A system for preparing or semi-preparing food, comprising:
    a 3D printer disposed above a food supporting device, the 3D printer comprising a food-paste extruder, a first heating device associated with the extruder and a first cooling device associated with the extruder;
    a cooking hob for heating the modelled food on the food supporting device, the cooking hob comprising a heater or a heating element adapted to heat all or a portion of the food supporting device;
    a controller operatively coupled to the 3D printer to operate said extruder, said first heating device and said first cooling device;
    said controller adapted to:
        operate the extruder to deliver a first food paste having a first composition through the extruder onto the food supporting device to yield a first portion of a modelled food while simultaneously operating one or both of said first heating device and said first cooling device to adjust a temperature of the first food paste to a first precooking temperature as it passes the extruder for delivery to the food support device, and
        operate the extruder to deliver a second food paste having a second composition through the same extruder onto the food supporting device to yield a second portion of the modelled food while simultaneously operating one or both of said first heating device and said first cooling device to adjust a temperature of the second food paste to a second precooking temperature as it passes the extruder for delivery to the food support device;
    said first and second precooking temperatures for the respective first and second food pastes being independently adjustable for the respective first and second food pastes inside the extruder such that said first and second precooking temperatures are different from one another;

said heater or heating element being operable to cook the modeled food on the food supporting device, wherein the food supporting device is a pan, a cooking vessel, a cooking pot, a tray, a plancha or a container arranged on said cooking hob.

17. The system according to claim 16, said heater or heating element defining a cooking zone of the cooking hob on which said food supporting device rests.

18. The system according to claim 16, wherein the food supporting device includes or corresponds with a further cooling device for cooling down the modelled food or components of said modelled food on the food supporting device.

* * * * *